(12) United States Patent
Nicholson

(10) Patent No.: US 10,532,452 B2
(45) Date of Patent: Jan. 14, 2020

(54) PIVOTING REMOVAL TOOL

(71) Applicant: Schlumberger Technology Corporation, Sugar Land, TX (US)

(72) Inventor: Christopher D Nicholson, Cincinnati, OH (US)

(73) Assignee: Schlumberger Technology Corporation, Sugar Land, TX (US)

( * ) Notice: Subject to any disclaimer, the term of this patent is extended or adjusted under 35 U.S.C. 154(b) by 137 days.

(21) Appl. No.: 15/553,582

(22) PCT Filed: Feb. 26, 2016

(86) PCT No.: PCT/US2016/019826
§ 371 (c)(1),
(2) Date: Aug. 25, 2017

(87) PCT Pub. No.: WO2016/138412
PCT Pub. Date: Sep. 1, 2016

(65) Prior Publication Data
US 2018/0029209 A1 Feb. 1, 2018

Related U.S. Application Data

(60) Provisional application No. 61/121,305, filed on Feb. 26, 2015.

(51) Int. Cl.
*B25B 27/24* (2006.01)
*E21B 23/00* (2006.01)
(Continued)

(52) U.S. Cl.
CPC .............. *B25B 27/24* (2013.01); *E21B 23/00* (2013.01); *E21B 34/00* (2013.01); *F16K 3/30* (2013.01)

(58) Field of Classification Search
CPC ................................................ Y10T 137/6109
(Continued)

(56) References Cited

U.S. PATENT DOCUMENTS 1,492,877 A * 5/1924 Davis .................... B25B 27/023
29/262
1,513,031 A * 10/1924 Brown .................. B25B 27/023
29/259
(Continued)

OTHER PUBLICATIONS

International Preliminary Report on Patentability for the equivalent International patent application PCT/US2016/019826 dated Sep. 8, 2017.
(Continued)

*Primary Examiner* — Robert K Arundale
(74) *Attorney, Agent, or Firm* — Jeffrey D. Frantz

(57) ABSTRACT

A tool includes a shaft having a front end and a distal end; a displacement mechanism for extending and retracting the shaft; and one or more pivoting tool elements coupled to the tool shaft proximate to the distal end of the shaft, wherein the one or more pivoting tool elements includes a body having an upper element and a lower element, wherein the one or more pivoting tool elements includes a pivot point about which the upper element and lower element pivot while coupled to the shaft. A method includes extending the tool shaft and the pivoting tool element into a bore of the flow control device; pivoting the pivoting tool element while extending the tool shaft through a removable component of the flow control device; and removing the removable component from the flow control device by retracting the tool shaft through the bore of the choke.

18 Claims, 5 Drawing Sheets

(51) Int. Cl.
*E21B 34/00* (2006.01)
*F16K 3/30* (2006.01)

(58) Field of Classification Search
USPC .............................................. 29/213.1, 221.6
See application file for complete search history.

(56) References Cited

U.S. PATENT DOCUMENTS

| | | | |
|---|---|---|---|
| 1,517,883 A | | 12/1924 | Alleman |
| 1,553,171 A | * | 9/1925 | Jones ...................... B25B 27/02 29/262 |
| 1,676,775 A | * | 7/1928 | Doherty .................. B25B 27/00 29/262 |
| 3,691,612 A | * | 9/1972 | Layne ..................... B25B 27/062 29/266 |
| 3,990,139 A | | 11/1976 | Toughet |
| 4,928,726 A | | 5/1990 | Johnson et al. |
| H1349 H | * | 9/1994 | Kelley ............................ 29/259 |
| 5,533,245 A | | 7/1996 | Stanton |
| 2011/0173814 A1 | | 7/2011 | Patel |
| 2015/0283689 A1 | * | 10/2015 | Weaver .................. B25B 27/062 29/890.121 |

OTHER PUBLICATIONS

International Search Report and Written Opinion for the equivalent International patent application PCT/US2016/019826 dated May 25, 2016.

* cited by examiner

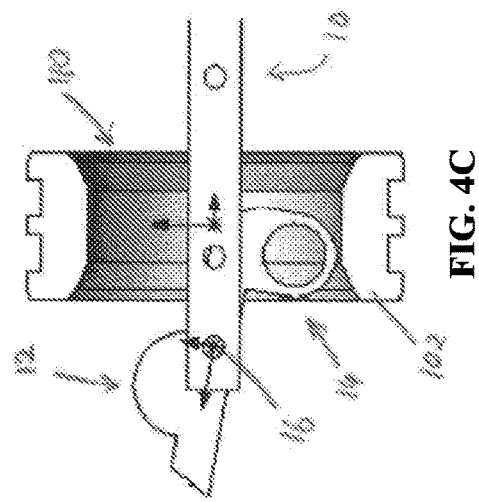
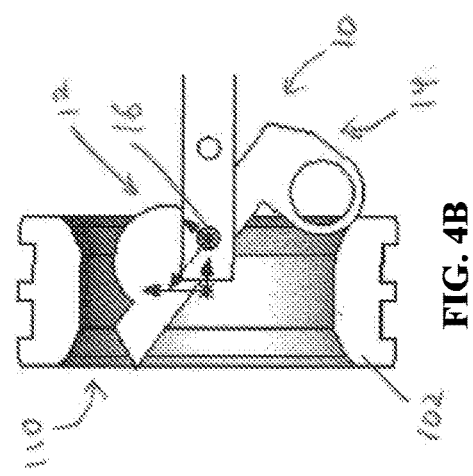
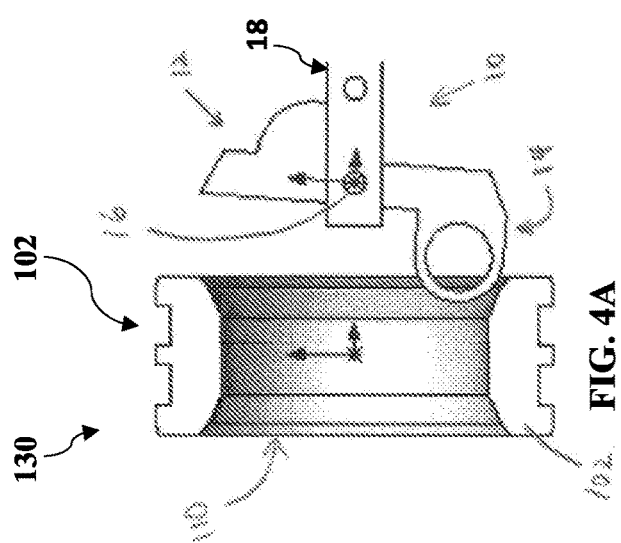
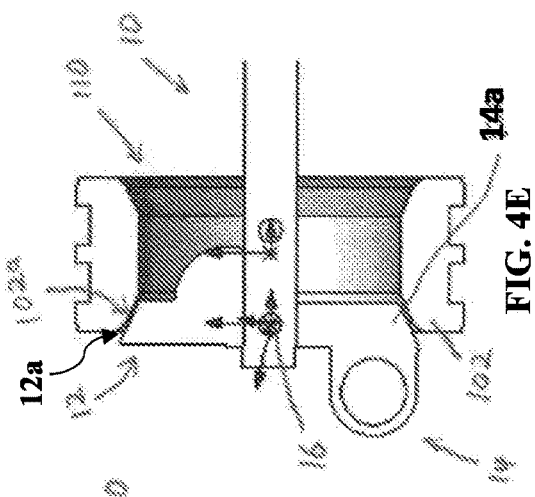
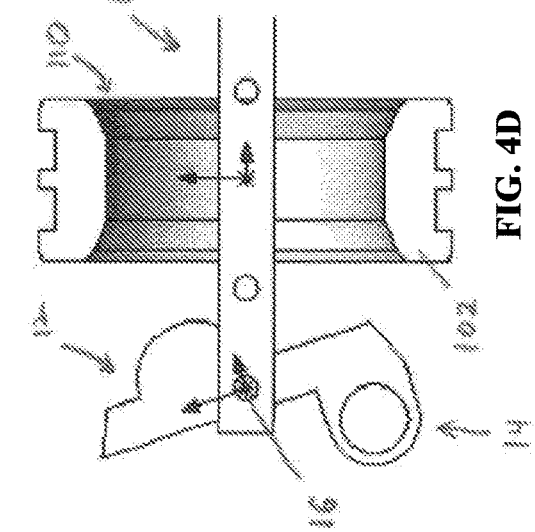

PIVOTING REMOVAL TOOL

CROSS-REFERENCE TO RELATED APPLICATION

The present document is based on and claims priority to U.S. Provisional Application Ser. No. 62/121,305, filed Feb. 26, 2015, which is incorporated herein by reference in its entirety.

BACKGROUND

A choke controls pressure in a wellbore by controlling the size of an aperture through which a fluid passes to move through the choke. Many components of the choke undergo wear and tear due to forces applied by the fluid moving through the choke. Chokes are used in various industries, such as the oil and gas industry, the waste management industry, the food industry, etc. Tools for removing and re-installing components of a choke can be useful in situations or applications where the components are mounted at locations that are difficult to reach within the choke. For example, a choke may be used in the oil and gas industry to, for example, control a drilling fluid or a produced fluid into or out of a well. Because the drilling fluid or produced fluid may wear one or more internal components of the choke, the one or more components may be removed from the choke and replaced as needed.

BRIEF DESCRIPTION OF THE DRAWINGS

Various aspects and advantages of the claimed subject matter are better understood when the following detailed description is read with reference to the accompanying drawings, in which:

FIG. 4A shows a pivot mechanism on a tool in an original position shown prior to entering a bore of a seat in accordance with one or more embodiments of the present disclosure.

FIGS. 4B and 4C show the pivot mechanism being pivoted as it moves through the bore of the seat in accordance with one or more embodiments of the present disclosure.

FIG. 4D shows the pivot mechanism returning to the original position after moving through the bore of the seat in accordance with one or more embodiments of the present disclosure.

FIG. 4E shows the pivot mechanism engaging a back side of the seat for removal of the seat in accordance with one or more embodiments of the present disclosure.

DETAILED DESCRIPTION

Figure 1:
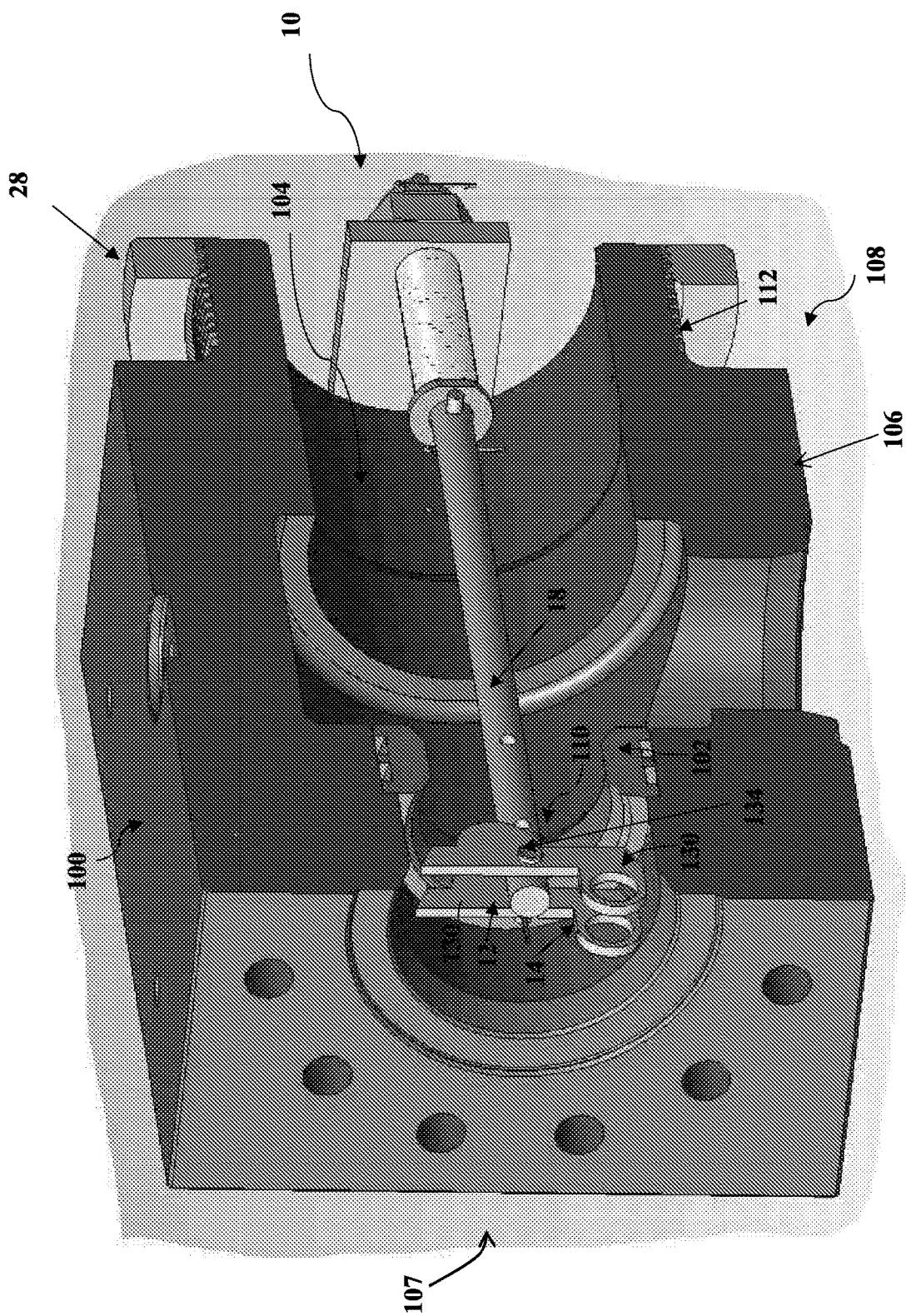
FIG. 1 shows a tool with two pivot components on either side of a tool shaft in accordance with one or more embodiments of the present disclosure.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Embodiments disclosed herein generally relate to a choke and tools and methods for servicing the choke. More specifically, embodiments disclosed herein relate to tools and methods for removing and re-installing components, such as internal components, of a choke. For example, one or more embodiments disclosed herein relate to a tool that may be used to retrieve a seat in a bore of a choke. According to one or more embodiments of the present disclosure, the tool may be removeably attached to a front end of a choke and may include one or more pivoting tool elements. The pivoting tool elements may have a specific height, shape, and profile to allow the pivoting tool elements to both pass through a bore of a component located within a choke and to also engage with a reverse side of the component for pulling the component out through the bore. Further, the same tool shaft may be coupled with a reinstallation component for reinstalling a same or different component into the bore of the choke.

According to one or more embodiments of the present disclosure, a tool is provided that may include a shaft having a front end and a distal end. The tool may further include a displacement mechanism for extending and retracting the shaft, whereby the displacement mechanism is coupled to the front end of the shaft. The tool may further include one or more pivoting tool elements coupled to the tool shaft proximate to the distal end of the shaft. The one or more pivoting tool elements may each include a body having an upper element and a lower element. The one or more pivoting elements may include a pivot point about which the upper and lower elements pivot while coupled to the shaft.

According to one or more embodiments, a method for using a tool may include coupling a component removal tool to a flow control device. The component removal tool may include a tool shaft and a pivoting tool element coupled to a distal end of the tool shaft. The pivoting tool element may be pivotable about a pivot point on the tool shaft. A method may further include extending the tool shaft and the pivoting tool element into a bore of the flow control device. The pivoting tool elements may be pivoted while extending the tool shaft through a removable component of the flow control device. Further, a method according to one or more embodiments may include removing the removable component from the flow control device by retracting the tool shaft through the bore of the flow control device. In one or more embodiments, the component removal tool may also be used to install a component in the flow control device.

Further, a system according to embodiments of the present disclosure may further include a flow control device having a bore and a removable component disposed in the bore, whereby the removable component includes a bore in fluid communication with the bore of the flow control device. The component removal tool may further include a tool shaft having a front end and a distal end and one or more pivoting tool elements coupled proximate to the distal end of the tool shaft. The component removal tool may further include a displacement mechanism for extending and retracting the tool shaft and the one or more pivoting tool elements through the bore of the removable component, wherein the displacement mechanism is coupled proximate to the front end of the tool shaft.

Referring now to FIG. 1, a cutaway perspective view of flow control device or choke 100 taken from a rear side 107 of the choke 100 is shown. According to one or more embodiments, tool 10 is shown extended inside the choke 100 and configured to engage one or more internal components of the choke 100 to remove or install the one or more internal components of the choke 100. As known in the art, a choke may be a flow control device used to control a flow of a fluid through a passageway. As used herein, fluids may refer to liquids, gases, and/or mixtures thereof. In one example, chokes may be used in the oil and gas industry to control a backpressure of a fluid, and are often used in well control operations to enable production parameters of fluids that are produced from a well to be closely controlled.

In one or more embodiments, choke 100 may include a front end or bonnet 108. Additionally, choke 100 may include an axially moving gate (not shown) that engages a stationary annular seat (annular seat 102 as shown in FIG. 1) which may create an orifice, such as an annular orifice, that varies in area as the gate moves in and out from the seat 102. According to one or more embodiments, engaging (or disengaging) such a gate (not shown) with the annular seat 102 may be used to control the flow of the fluid through the choke 100 and therefore control pressure of the fluid. In one or more embodiments, choke 100 may be an adjustable choke, a fixed or positive type choke, or any other type of choke known in the art. According to one or more embodiments, choke 100 may include annular seat 102 as part of an internal system to control flow through a body 106 of the choke 100. Annular seat 102 may be slid into place in a bore 104 in the body 106 of choke 100. Bore 110 of seat 102 may be in fluid communication with bore 104 of choke 100. Annular seat 102 may be specifically sized with tight tolerances to fit within bore 104 by being pressed tightly into place (e.g., press-fit). Thus, annular seat 102 may not require additional fasteners or adhesive to remain firmly in place within bore 104 of choke 100. According to one or more embodiments, annular seat 102 may be cylindrically shaped. Those of ordinary skill in the art will appreciate that in other embodiments, annular seat 102 may be of other shapes and configurations, and may also be coupled to one or more interior surfaces of choke 100.

After a period of time in operation, internal components of a choke, such as, without limitation, annular seat 102, may require repair, maintenance, or replacement. For example, annular seat 102 may wear with use as different fluids may include abrasive particles or may have a high flow rate which may wear down edges and/or surfaces of annular seat 102. Such wear and tear on annular seat 102 may negatively affect sealing between the gate and the annular seat. A reduced seal between the gate and annular seat may affect the ability of the choke to control fluid flow therethrough, which may affect, for example, a backpressure created using such a component. Accordingly, different conditions within choke 100 and the fluids flowing through such a choke may cause repairs or maintenance to be needed on one or more internal components, e.g. annular seat 102 of choke 100. In one or more embodiments, tool 10 may be used to retrieve or remove such a component (e.g., annular seat 102) from choke 100 for repairs, maintenance, or replacement.

FIG. 1 illustrates tool 10 as being fully extended into a bore 104 of choke 100. Tool 10 may include one or more pivoting tool elements 130 and a tool shaft 18. As shown in FIG. 1, one or more pivoting tool elements 130 may be coupled to either side of the tool shaft 18 proximate to a distal end of tool shaft 18. Pivoting tool elements 130 (as further explained below and shown in FIG. 3) are individual elements that may be coupled to either side of the tool shaft 18 at or near the distal end of the tool shaft 18. Pivoting tool elements 130 are configured to pivot about a pivot point (e.g. pivot point 16 shown in FIG. 3) and may be used to grasp or pull seat 102 so as to dislodge or remove seat 102 from its installed position and ultimately pull seat 102 through bore 104 and out through a front opening of choke 100. According to one or more embodiments, (as shown in FIGS. 4A-4E), pivoting tool elements 130 may be initially located on a front side of seat 102 and upon contacting a front surface of seat 102 may rotate so that the pivoting tool elements 130 rock backwards (or forwards) in some embodiments, thus allowing pivoting tool elements 130 to pass through bore 110 of seat 102 and through to the other side of seat 102. Upon passing through the bore 110, the pivoting tool elements 130 are configured to return to their original position because pivoting tool elements 130 are configured to rotate, and gravitational forces may pull the pivoting tool elements 130 back into their original position, i.e. perpendicular to the axis of the shaft. Examples of pivoting tool elements 130 in accordance with embodiments disclosed herein are described in greater detail below.

Once seat 102 is installed into bore 104 of choke 100 using tool 10 or other methods known in the art, maintenance operations may be conducted from the bonnet end 108 (front end) of the choke 100. According to one or more embodiments, tool 10 may be used to remove the annular seat 102 from the body 106. As further explained below, tool 10 may extend through the bore 110 in the annular seat 102, engage seat 102 at a rear side of annular seat 102 (i.e., on the side away from or opposite the bonnet end 108) and pull the annular seat 102 out of the bore 104.

Figure 2:
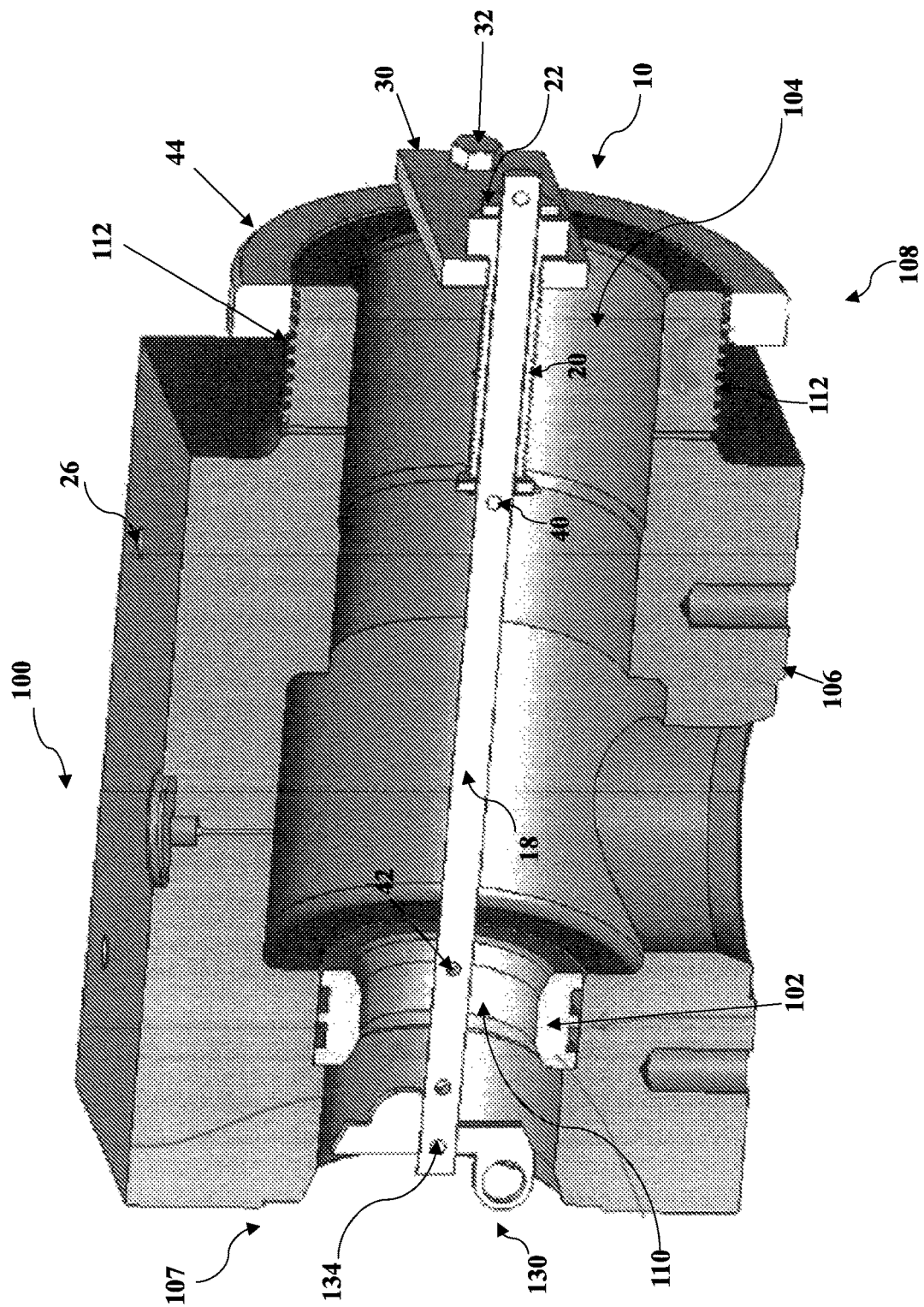
FIG. 2 shows a sectional view of a tool in a choke in accordance with one or more embodiments of the present disclosure.

Turning to FIG. 2, FIG. 2 shows a sectional view of choke 100. In FIG. 2, tool 10 is fully extended through bore 104 in choke 100. FIG. 2 shows a single tool element 130 coupled at or proximate to a distal end of tool shaft 18. According to embodiments of the present disclosure, one or more pivoting tool elements 130 may be coupled to the distal end of the tool shaft 18. For example, the tool shaft 18 includes two pivoting tool elements 130, as shown in FIG. 1. FIG. 2 shows a sectional view of tool 10 extended through bore 104 and as such shows only one of the pivoting tool element 130 coupled to a distal end of tool shaft 18. It is noted that, in one or more embodiments, tool 10 may include at least two pivoting tool elements 130, while in other embodiments, tool 10 may include only one pivoting tool element for retrieving a component of a choke, such as annular seat 102. It is noted that having at least two pivoting tool elements, such as tool elements 130 may provide a better means of grasping a rear side of annular seat 102 to ensure that all sides of annular seat 102 are pulled out of bore 104 at relatively the same time or even simultaneously. Further, having at least two pivoting tool elements 130 may prevent the annular seat 102 from being pulled out crookedly and/or becoming stuck in bore 104 of choke 100. According to embodiments of the present disclosure, tool 10 may include at least three, four, five, or any number of pivoting tool elements such as tool elements 130. Such tool elements may be positioned on either side of tool shaft 18 (as shown in FIG. 1) or may all be coupled to a single side of tool shaft 18. Further, in one position, the pivoting tool elements 130 may be perpendicularly oriented with respect to a longitudinal axis of shaft 18 and may rotate to a second position wherein the pivoting tool elements 130 are parallel with respect to the longitudinal axis of shaft 18. In one or more embodiments, the tool elements may be evenly spaced apart or may be unevenly spaced apart from one another.

In one or more embodiments, pivoting tool elements 130 are coupled to either side of tool shaft 18 with a fastener 134.

Fastener 134 may be inserted into one or more holes 42 provided along tool shaft 18. Thus, pivoting tool elements may include a hole (not shown) and may be positioned so that the hole of the pivoting tool elements and a hole 42 on tool shaft 18 are aligned. Then, a fastener, such as fastener 134 may be inserted to couple pivoting tool element(s) 130 to tool shaft 18 through hole 42. In one or more embodiments, a fastener, shown as fastener 134, is used to couple pivoting tool elements 130 to tool shaft 18. Any type of fastener, including screws, bolts, pins, rivets, or any other fastener may be used as known in the art to couple pivoting tool elements 130 tool shaft 18 such that pivoting tool element 130 may still be rotatable.

Figure 5:
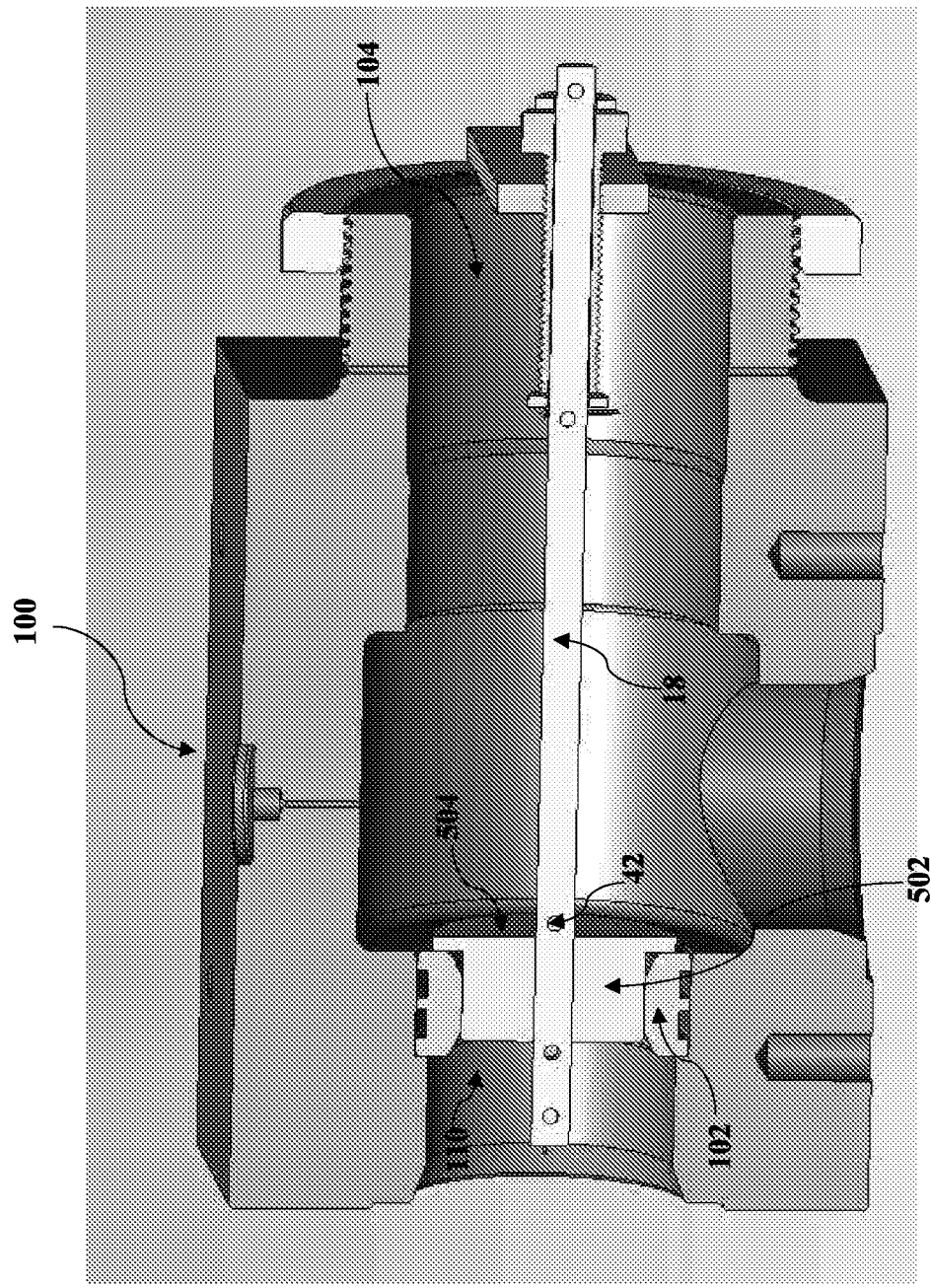
FIG. 5 shows an installation component for installing a seat using a tool in accordance with one or more embodiments of the present disclosure.

It is noted that one or more holes 42 may be included anywhere along a longitudinal axis tool shaft 18. In one or more embodiments, other tool elements other than pivoting tool elements 130 (e.g., flanged cylindrical component 502 as shown in FIG. 5) may be coupled to tool shaft 18 and may be located at different positions along tool shaft 18.

Tool 10 may further include an attachment mechanism 28 for attaching tool 10 to choke 100. In one or more embodiments, tool 10 attaches to the body 106 of the choke 100 using attachment mechanism 28. Attachment mechanism 28 may include bonnet threads 112 for coupling to the body 106 of choke 100. For example, in one or more embodiments, attachment mechanism 28 may include a ring 44 having complementary threads for engaging bonnet threads 112. Such complementary threads of ring 44 may be located along an inner surface of the ring 44. Thus, ring 44 may be threadably engaged to lock onto threads 112 located on a bonnet end 108 of choke 100. The tool shaft 18 is then coupled to the ring 44 as described below so that the tool 10 may be centered in the bore 104 of choke body 106, thereby allowing the tool to move in and out of the bore 104 for removal and installation of components of the choke 100.

For example, attachment mechanism 28 may further include a plate 30 that may be coupled to a front side of ring 44. As shown in FIG. 2, a bolt 32 is used to secure plate 30 to the front side of ring 44, but other mechanisms (e.g., adhesives, integrally forming, welding, etc.) for securing plate 30 as known in the art may also be used. Plate 30 may include an opening through a face of plate 30 through which tool shaft 18 may be coupled to plate 30. Plate 30 may be used to centrally position tool shaft 18 through bore 104 of choke 100. As previously stated, it may be useful to center tool shaft 18 through bore 104 of choke 100 so as to prevent tool shaft 18 from unnecessarily contacting one or more interior surfaces of choke 100.

Figure 3:
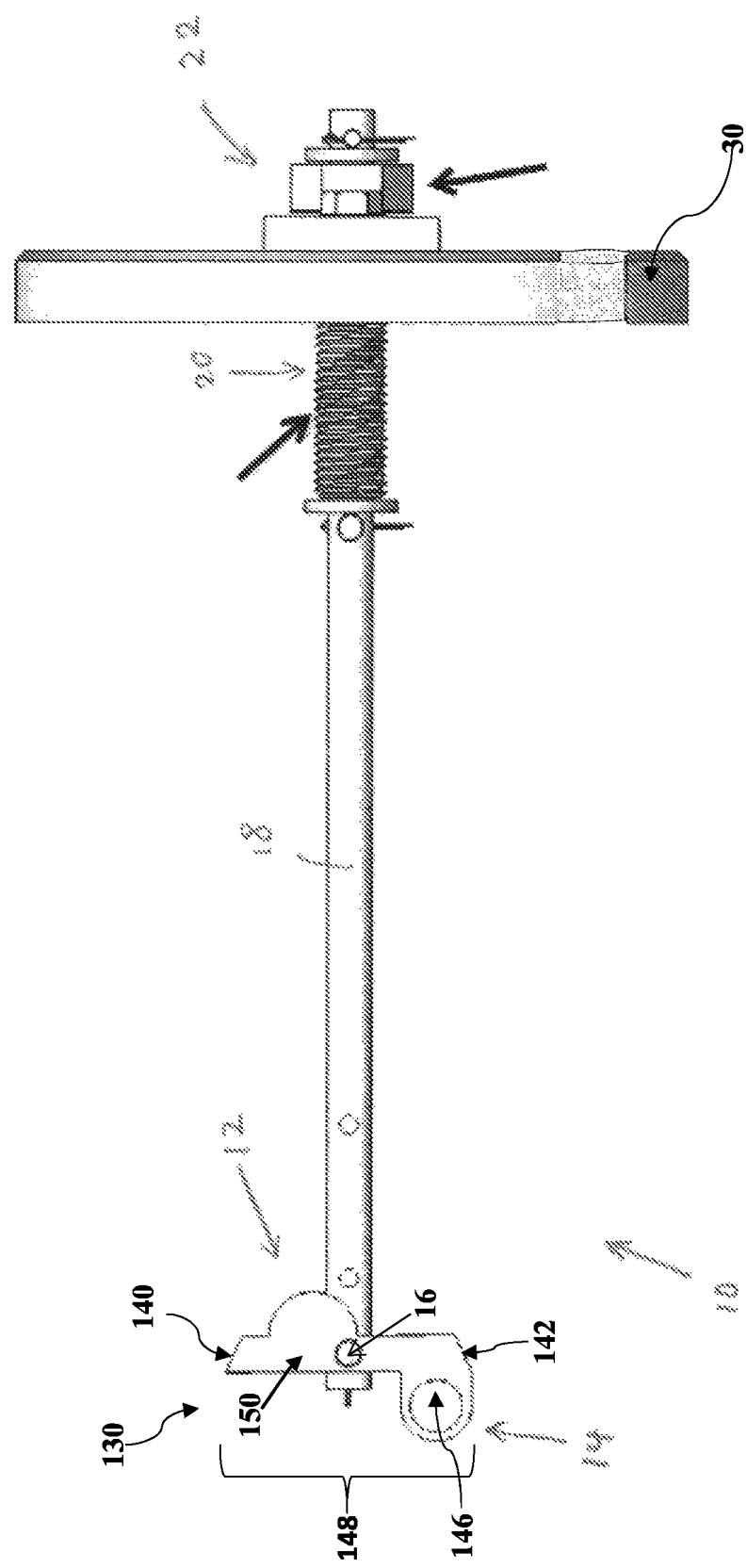
FIG. 3 shows a side view of a tool in accordance with one or more embodiments of the present disclosure.

According to one or more embodiments, tool shaft 18 may be extended into and retracted from bore 104 of choke 100. As shown in FIGS. 2 and 3, a threaded nut 22 and threaded sleeve 20 are used as a type of displacement mechanism that are capable of extending and retracting tool shaft 18 into bore 104 of choke 100 when tool shaft is coupled to threaded sleeve 20. In one example, a front end of tool shaft 18 may be coupled to threaded sleeve 20. As shown in FIG. 2, tool shaft 18 is inserted through threaded sleeve 20 and is coupled to the threaded sleeve 20 by a fastener, such as fastener 40. Other means for securing threaded sleeve 20 about tool shaft 18 may be also be used as known in the art.

As shown in FIG. 2, threaded sleeve 20 may be coupled to an opposite face of plate 30 from threaded nut 20. The threaded sleeve 20 extends through the plate 30 and the threaded nut 22 engages an outer thread of the threaded sleeve 20. Thus, threaded sleeve 20 may be extended and retracted by manipulating the threaded nut 22 that is disposed on the opposite face of plate 30. For example, as threaded nut 22 is tightened, the threaded sleeve 20 is moved in a direction out of the bore 104 of the choke 100, thereby retracting tool shaft 18. As the threaded nut 22 is loosened (or rotated in an opposite direction), the threaded sleeve 20 is moved in a direction into the bore 104 of the choke 100, thereby extending the tool shaft 18 into the bore. Thus, tool shaft 18 and pivoting tool elements 130 may be extended and retracted into bore 104 of choke 100 so as to retrieve annular seat 102.

In one or more embodiments, a wrench (not shown) or other tool may be used to manipulate a position of threaded nut 22 so that threaded sleeve 20 may extend and retract into bore 104 of choke 100, which causes tool shaft 18 and the attached pivoting tool elements 130 to extend and retract into bore 104. While FIGS. 1-3 show threaded sleeve 20 and nut 22 used to extend and retract tool shaft 18, other embodiments may be used. For example, tool 10 may include a slide hammer type drive, a cam or lever drive, or a hydraulic or pneumatic drive. Other mechanisms for extending tool shaft 18 into bore 104 of choke 100 may also be used.

In one or more embodiments, manipulating a position of the threaded nut 22 by turning the threaded nut 22 in one direction repeatedly may cause the threaded sleeve to also turn and extend. When using tool 10 to retrieve seat 102, upon retrieving seat 102 using one or more pivoting tool elements 130 (as further discussed below and shown in FIGS. 4A-4E) the threaded nut may be turned in an opposite direction to retract the tool shaft 18 which has at this point grasped the back side of seat 102 and bring forward seat 102 towards the opening of the choke 100. In one or more embodiments, to retrieve seat 102 after it has been pulled towards a front opening of choke 100 the tool 10 may be unattached by unbolting bolt 32 for example and unthreading ring 44 from a front end or bonnet 108 of choke 100.

Those of ordinary skill will appreciate that other attachment mechanisms may be used for extending tool shaft 18 through a central bore 104 of choke 100 without departing from the scope of embodiments disclosed herein. In other embodiments, bonnet end 108 of choke 100 may not include threads 112. Accordingly, an extension member (not shown) may be coupled to one or more holes 26 disposed along an outer surface of choke 100 and may be used to extend a tool shaft 18 having threaded sleeve 20 and pivoting tool element (s) 130 into bore 104 to retrieve annular seat 102.

Further, in other embodiments, tool 10 may also be attached to a front side of choke body 106 via any type of fasteners coupled to a front side of choke body 106. In other embodiments, tool 10 may also be attached to choke body 106 using one or more clamps. Further, in other embodiments, tool 10 may be attached to a choke body 106 by friction fit or by bracing ring 44 and the other components of attachment mechanism 28 against the choke body 106.

Turning to FIG. 3, tool 10 is shown removed from a choke. FIG. 3 further shows pivoting element 130 coupled to one end of tool shaft 18. In one or more embodiments, components of tool 10, including pivoting element 130, tool shaft 18, attachment mechanism, etc., may be made of any type of metal, including steel. Those of ordinary skill will appreciate that other materials may be utilized, including, without limitation, any type of plastics or a combination of plastics and metals.

As shown in FIG. 3, pivoting tool element 130 may be formed as a single piece having a body 150 and may also include an upper element 12 and a lower element 14. According to embodiments of the present disclosure, upper element 12 protrudes outwardly from a front face of the body 150 of pivoting tool element 130 Lower element 14 protrudes outwardly in an opposite direction from upper element 12. In one or more embodiments, lower element 14 of pivoting tool element 130 may include an opening 146 that may extend through the lower element 14. In one or more embodiments, opening 146 may be substantially large and encompass a large portion of lower element 14 (as shown in FIG. 3). Nonetheless, those of ordinary skill in the art will appreciate that opening 146 and lower element 14 may be of any needed size. Upper element 12 and lower element 14 are designed to contact a component of choke 100, such as seat 102, and allow for pivoting tool element 130 to pivot back to its center of gravity when pivoting tool element 130 is caused to rock backwards or forwards.

Pivoting tool element 130 may include a top side 140 and a bottom side 142. Top side 140 may be a top side of body 150 and bottom side 142 may be a bottom side of body 150. In one or more embodiments, top side 140 and bottom side 142 may include tapered edges. In one or more embodiments, the tapered edges may be angled in an upward or downward direction. Such tapered edges may be configured to contact one or more interior surfaces of annular seat 102, whereby upon contacting the one or more interior surfaces of annular seat 102, there may be enough surface tension between such tapered edges of pivoting tool element 130 and seat 102, whereby annular seat 102 may be pulled out of its seated position. In other embodiments, pivoting tool element 130 may be tapered at only the top side 140 or the bottom side 142.

Further, in one or more embodiments an opening (not shown) may be located on body 150 of pivoting tool element 130. In one or more embodiments, the opening may be generally centrally located along a longitudinal axis of vertical body 150. The opening may correspond or align with pivot point 16 (as shown in FIG. 3), as this opening may be the point where pivoting tool element 130 may be coupled to a tool shaft 18 so as to allow the pivoting tool element 130 to pivot. A fastener, such as fastener 34, may be inserted through this opening as located on body 150 of pivoting tool element 130.

Further, in one or more embodiments, pivoting tool element 130, including top side 140 and bottom side 142, may be configured to correspond to a shape of an interior of annular seat 102. For example, a shape of one or more surfaces of the pivoting tool element 130 may correspond to a shape of a component (e.g., seat 102) of the choke 100 so that the pivoting tool element 130 securely engages the components. Further, pivoting tool element 130 may be configured to have a specific height 148. In one or more embodiments, height 148 of pivoting tool element 130 may allow pivoting tool element 130 to pass through a bore 110 of annular seat 102, and also may be of a sufficient height so that either top side 140 or bottom side 142 of pivoting tool 130 is capable of engaging and contacting one or more outer surfaces of a back side (e.g. 102(*a*) in FIG. 4E) of annular seat 102. The height of the pivoting tool element may be measured from top side 140 of the pivoting tool element 130 to the bottom side 142 of pivoting tool element 130. Thus, pivoting tool element 130 may include a height 148 that is larger than an inner diameter of a component of the choke, for example the component to be removed, such as seat 102. Thus, pivoting tool element 130 may have a height greater than a diameter of a bore of a component when in an extended position, but when the pivoting tool element 130 is moved about pivot point 16, the height of the pivoting component may be oriented to align more closely with the axis of the tool shaft 18 (e.g., in a collapsed position), thereby allowing the pivoting tool element 130 to be passed through the bore of the component. Top side 140 and bottom side 142 may touch or contact the interior top and bottom surfaces of seat 102 and may have one or more edges (e.g. 140 and 142) that match a contour of seat 102, but the height 148 of pivoting tool 130 may prevent pivoting tool element 130 from extending through bore 110 of seat 102 without rotating.

Those of ordinary skill in the art will appreciate that pivoting tool element(s) 130 may be configured to fit any sized annular seats, such as annular seat 102 or other internal components of a choke. Thus, pivoting tool element(s) 130 may be designed in a range of sizes and thicknesses to suit the component that they are used to retrieve.

In one or more embodiments, pivoting tool element 130 is configured to turn or pivot about a pivot point 16 in either a reverse or forward direction as the tool shaft 18 extends through bore 104 of choke 100. In this manner, pivoting tool element 130 is enabled to pass through a bore 110 of annular seat 102 (i.e. passing from a front side of annular seat 102 to a back side of annular seat 102) by pivoting the pivoting tool element 130 about a pivot point 16 while tool shaft 18 is being extended past the back side of annular seat 102 (as further shown in FIGS. 4D and 4E and further explained below). Upper element 12 and lower element 14 may operate to restore the center of gravity of pivoting tool element 130 when pivoting tool element 130 is initially caused to rock forward or backward upon encountering annular seat 102. It is noted that pivot point 16 is also a location of fastener 134 as shown in FIG. 1 and FIG. 2. Thus, in one or more embodiments, gravitational force exerted on upper element 12 may bias pivoting tool element 130 to an extended position.

In one or more embodiments, upper element 12 may act as counterweight to lower element 14 and vice versa. The protruding component of lower element 14 is able to restore a balance of pivoting tool element 130 when pivoting tool element 130 attempts to return to its center of gravity. Having an opening, such as opening 146 in lower element 14, may make lower element 14 lighter in weight than upper element 12, which allows upper element 12 to rock forward and return to its center of gravity.

FIGS. 4A-4E show pivoting tool element(s) 130 in operation according to one or more embodiments of the present disclosure. As shown in FIG. 4A, pivoting tool element(s) 130 has been extended into bore 104 of choke 100. In FIG. 4A, tool shaft 18 is extended close to a front side of annular seat 102. To operate tool 10, tool shaft 18 is moved into the bore 104 of choke 100 and pivoting tool element 130 contacts seat 102, thus causing pivoting tool element 130 to pivot. Rotation (pivoting) of pivoting tool element 130 about pivot point 16 allows pivoting tool element(s) 130 is to fit through bore 110 of seat 102 as tool shaft 18 is extended further into the bore 104. As shown in FIG. 4A, according to one or more embodiments of the present disclosure, pivoting tool element 130 includes a protruding lower end 14 that may encounter or make initial contact with a lower front edge of seat 102 before the rest of pivoting tool element 130 makes any contact with seat 102. As shown in FIG. 4A, upon contact by lower element 14 with an edge of seat 102, upper element 12 begins to rock and/or pivot so that upper element 12 is not positioned at its center of gravity. In other embodiments, the pivoting tool element 130 may be configured such that the upper element 12 contacts the seat 102 (or other removable choke component) before the lower end 14. Thus, the initial contact of lower element 14 (or in some embodiments, upper element 12) with one or more edges at a front side of seat 102 causes pivoting tool element 130 to begin its rotation about pivot point 16. As tool shaft 18 of tool 10 is extended into bore 104 of choke 100, pivoting tool element 130 continues to rock backwards (as shown in FIG. 4B) due to gravity. FIGS. 4B and 4C show the progression of pivoting tool element 130 as it rocks/pivots from its extended position towards a more angled, collapsed position whereby pivoting tool element 130 may become almost horizontal when passing through bore 110.

In one or more embodiments, a height, such as height 148 of pivoting tool element 130 is designed to allow contact with an edge of seat 102, but is still larger than an inner diameter of seat 102. To pass through bore 110 of seat 102, pivoting tool element 130 may be pivoted to a collapsed position and tool shaft 18 extended through bore 110 of seat 102, thus inserting pivoting tool element 130. In one or more embodiments, a turning force applied to a threaded nut 22 (as shown in FIGS. 1-3) and threaded sleeve 20 causes tool shaft 18 to continue to extend or advance into bore 104 of choke 100 and bore 110 of seat 102 as the pivoting action of pivoting tool 130 occurs. FIG. 4C shows that pivoting tool element 130 may rock backwards to its collapsed position while passing through bore 110 of seat 102 and into a position where tool 10 may pass through bore 110 of seat 102. In other words, pivoting tool element 130 may become parallel or almost parallel with tool shaft 18.

Once the pivoting tool element passes through the seat 102 (or other removable choke component), according to one or more embodiments, upper element 12 pivots back to its original position (as shown in FIG. 4D), in which it is oriented generally perpendicular to the tool shaft 18. The original position of pivoting tool element 130 may be an extended position whereby pivoting tool element 130 is generally perpendicular to tool shaft 14. As noted above, having an opening, such as opening 146 included in lower element 14 may allow upper element 12 to act as a counterweight that is heavier than lower element 14 and assist upper element 12 in rocking forward to its original position.

According to one or more embodiments, pivoting tool element 130 includes tapered top and bottom sides 140 and 142, which may be configured to match a corresponding profile of a top and bottom surface of seat 102. After tool shaft 18 has been fully extended and pivoting tool element 130 has passed through bore 110 of seat 102, tool shaft 18 may be retracted. According to one or more embodiments, retracting tool shaft 18 may occur by turning threaded nut 22 in an opposite direction so as to retract threaded sleeve 20. As noted above, other means for extending and retracting tool shaft 18 may be used including any other electrical, automatic, or mechanical means known in the art.

It is noted that the pivoting tool element 130 may have a profile such that pivoting tool element 130 may not pass back through bore 110 of the seat 102 once pivoting tool element 130 has initially passed from a front side of seat 102 through the bore of the seat and to the back side of seat 102. Accordingly, in one or more embodiments, pivoting mechanism 130 does not pivot forward towards the tool shaft 18 beyond its pivot point 16, but rather remains in its extended position, i.e. perpendicular to an axis of the tool shaft 18. As shown in FIG. 4E, one or more top edges 12a of pivoting tool element 130 may engage with a top surface seat 102 (e.g. 102(a)). By engaging with the top surface 102(a) of seat 102, pivoting tool element 130 may become centered once again to its extended position. Accordingly, one or more surfaces of pivoting tool element 130 (e.g. upper element 12 and lower element 14) may contact corresponding surfaces of a back side of seat 102 so that seat 102 is pulled out of the choke as the tool shaft 10 is retracted from the choke. In other words, tool shaft 18 may continue to be retracted which causes pivoting tool element 130 to engage firmly with one or more surfaces of a back side of seat 102 and to pull seat 102 out of its initially seated position in bore 104 of choke 100. Accordingly, seat 102 may be removed from an interior of bore 104 for further repair, maintenance, or replacement using tool 10.

It is noted that pivoting tool component 130 may not require any outside interaction to operate other than initial contact with seat 102. The shape of pivoting tool element 130 (and therefore carefully arranged center of gravity) may allow pivoting tool element 130 to automatically pivot backwardly through bore 110 from its initial position to a different orientation and then return to its original position in order to engage a back side of seat 102 (e.g. edge 102a as shown in FIG. 4E). In other embodiments, additional tools or devices may be used to manipulate a position of pivoting tool element 130. For example, one or more cables, strings, or wires may be used to push/pull the pivoting tool element 130 back and forth so as to fit through bore 110 and to move back to its original position. In other embodiments, one or more linkages or levers may also be used.

While FIGS. 4A-4E show pivoting tool element 130 pivoting backwardly from its initial extended position to a more collapsed position, in other embodiments, pivoting tool element 130 may be configured to pivot in a forward direction. Thus, alternatively, upper element 12 may be configured to be lighter in weight or to include an opening, such as opening 146 and lower element 14 may act as a counterweight. The same mechanisms for extending tool shaft 18 may be used to extend tool shaft into bore 104 of choke 110, and upon encountering one or more front edges of seat 102 by a back side of upper element 12, the pivoting tool element 130 may rock forward and continue to flatten out. As tool shaft 18 is extended through bore 110 of seat 102 and past the back side of seat 102, pivoting tool element 130 may then rock backward to its initial upright position with lower element 14 acting as a counterweight (i.e. it may be heavier and may not include an opening such as opening 146) to upper element 12. Thus, it is in keeping with one or more embodiments of the present disclosure, for pivoting tool element 130 to be configured to pivot about its pivot point 16 by either pivoting in a backward direction or in a forward direction. It is noted that the design of the pivoting tool element 130 may thus be selected so as to pivot about pivot point 16 by rocking initially either in a backwards direction or a forwards direction.

According to one or more embodiments, tool 10 may also be configured to reinstall a component (e.g. seat 102) located within bore 104 of choke 100. FIG. 5 shows such a tool for reinstalling the same component or a replacement component. As shown in FIG. 5, reinstallation of seat 102 may include replacing pivoting tool element(s) 130 with a flanged cylindrical component 502 that is coupled to a distal end of tool shaft 18. One or more fasteners (not shown) may be inserted through one or more holes 42 located along tool shaft 18 for coupling flanged cylindrical component 502 to tool shaft 18. In one or more embodiments, flanged cylindrical component 502 may have a diameter that may be approximately equal to bore 110 of seat 102. Flange 504 may be formed on a front face of cylindrical component 502 such that the cylindrical component 502 may be inserted into bore 110 of the seat 102. Flange 504 may engage with seat 102 thus pushing seat 102 through bore 104 and into a desired position. Thus, tool shaft 18 maybe used to retrieve and/or reinstall seat 102 in choke 100. Those of ordinary skill in the art will appreciate that the same seat 102 may be reinstalled after having been repaired or maintained or a replacement seat may instead be installed using cylindrical component 502. Further, in other embodiments, tool shaft 18 may be used to retrieve and/or reinstall any type of component within a bore 104 of choke 100.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A tool configured for removal of a component from a flow control device, the tool comprising:
    a shaft having a front end and a distal end;
    a displacement mechanism for extending and retracting the shaft, wherein the displacement mechanism is coupled to the front end of the shaft; and
    a pivoting tool element coupled to the shaft proximate to the distal end of the shaft,
    wherein the pivoting tool element comprises a body having an upper element and a lower element,
    wherein the pivoting tool element has a pivot point about which the upper element and lower element pivot while coupled to the shaft,
    wherein the upper element is heavier than the lower element, and
    wherein the lower element further comprises an opening.

2. The tool of claim 1, wherein the upper element includes a protruding end that is in a direction opposite to a protruding end of a lower element.

3. The tool of claim 1, wherein a top side or a bottom side of the pivoting tool element is tapered.

4. The tool of claim 1, wherein the pivoting tool element is coupled a side of the shaft.

5. The tool of claim 1, wherein the displacement mechanism further includes a threaded sleeve that encases a portion of the tool shaft.

6. The tool of claim 5, wherein the threaded sleeve is coupled to a threaded nut.

7. A method comprising:
    coupling the tool, according to claim 1, to a flow control device;
    extending the tool shaft and the pivoting tool element into a bore of the flow control device;
    pivoting the pivoting tool element while extending the tool shaft through a removable component of the flow control device; and
    removing the removable component from the flow control device by retracting the tool shaft through the bore of the flow control device.

8. The method of claim 7, wherein the pivoting the pivoting tool element comprises contacting a front surface of the removable component with the pivoting tool element, wherein contacting the front surface of the removable component causes the pivoting tool element to pivot about the pivot point.

9. The method of claim 7, wherein the removing the removable component further comprises contacting a back surface of the removable component with a front surface of the pivoting tool element as the tool shaft is retracted from the bore.

10. The method of claim 7, further comprising actuating the displacement mechanism to extend the tool shaft through the bore of the flow control device.

11. The method of claim 7, further comprising attaching the tool shaft to a front side of the flow control device.

12. The method of claim 7, further comprising, replacing the one or more pivoting tool elements with an installation tool element for installing the component in the bore of the flow control device.

13. A system comprising:
    a flow control device having a bore and a removable component disposed in the bore, wherein the removable component comprises a bore in fluid communication with the bore of the flow control device; and
    the tool according to claim 1.

14. The system of claim 13, wherein a height of the one or more pivoting tool elements is greater than a smallest inner diameter of the component.

15. The system of claim 13, wherein the displacement mechanism is comprised of a threaded sleeve coupled to a front end of the tool shaft and a threaded nut coupled to the threaded sleeve.

16. The system of claim 13, further comprising an attachment mechanism for attaching the component removable tool to a front face of the flow control device.

17. The system of claim 16, wherein the component removal tool is coupled to the attachment mechanism.

18. The system of claim 16, wherein the attachment mechanism includes a ring that is threadably engaged with threads located on a front face of the flow control device.

* * * * *